(12) United States Patent
Love

(10) Patent No.: US 6,908,216 B2
(45) Date of Patent: Jun. 21, 2005

(54) FLASHLIGHT HOLDER FOR FISHING NET

(76) Inventor: Jack G. Love, 1209 Monroe St., Great Bend, KS (US) 67530

( * ) Notice: Subject to any disclaimer, the term of this patent is extended or adjusted under 35 U.S.C. 154(b) by 28 days.

(21) Appl. No.: 10/622,602

(22) Filed: Jul. 17, 2003

(65) Prior Publication Data

US 2005/0024872 A1 Feb. 3, 2005

(51) Int. Cl.$^7$ .......................... F21V 33/00; A01K 75/02
(52) U.S. Cl. ...................... 362/253; 362/202; 362/191; 362/396; 43/17.5
(58) Field of Search ................................ 362/190, 191, 362/253, 399, 396, 202, 96; 43/11, 17.5, 18.1

(56) References Cited

U.S. PATENT DOCUMENTS

| | | | | |
|---|---|---|---|---|
| 1,268,622 A | * | 6/1918 | Reynolds | 362/396 |
| 1,321,842 A | * | 11/1919 | Otto | 248/540 |
| 3,077,693 A | * | 2/1963 | Wallin | 43/11 |
| 3,364,610 A | * | 1/1968 | Poole | 43/17 |
| 4,220,304 A | | 9/1980 | Wong et al. | 248/231 |
| 4,390,927 A | * | 6/1983 | Von Feldt | 362/476 |
| 4,542,447 A | | 9/1985 | Quakenbush | 362/183 |
| 4,707,772 A | | 11/1987 | Jimenez et al. | 362/110 |
| 4,799,132 A | | 1/1989 | Perlsweig | 362/118 |
| 4,800,667 A | * | 1/1989 | Johnson | 43/17.5 |
| 5,062,026 A | | 10/1991 | Maglica et al. | 362/72 |
| 5,144,546 A | | 9/1992 | Burdi | 362/191 |
| 5,181,774 A | * | 1/1993 | Lane | 362/549 |
| 5,335,149 A | * | 8/1994 | Evans | 362/477 |
| 5,601,356 A | | 2/1997 | McWilliams | 362/103 |
| 6,536,911 B1 | | 3/2003 | DiAngelo | 362/190 |

* cited by examiner

Primary Examiner—Ali Alavi
(74) Attorney, Agent, or Firm—Jeffrey L. Thompson; Thompson & Thompson, P.A.

(57) ABSTRACT

A flashlight holder is provided for removably attaching a flashlight to a tubular handle of a handheld fishing net. The flashlight holder has a first resilient clamp assembly that clamps over the tubular handle of the fishing net. The first resilient clamp assembly includes a generally tubular sleeve having an opening along one side that allows the tubular structure to expand and snap over the outer surface of the tubular handle of the fishing net. In one embodiment, the flashlight holder is attached to the flashlight by a second resilient clamp assembly that snaps over the tubular housing of the flashlight. In another embodiment, the flashlight holder is attached to the flashlight by an adhesive or by making the flashlight holder integral with the housing of the flashlight. A safety strap is provided to ensure the flashlight holder does not become detached inadvertently from the handle of the fishing net.

15 Claims, 3 Drawing Sheets

US 6,908,216 B2

FLASHLIGHT HOLDER FOR FISHING NET

BACKGROUND OF THE INVENTION

1. Field of the Invention

The present invention relates generally to flashlights and fishing equipment. In particular, the present invention relates to a flashlight holder that attaches a flashlight to a handle of a fishing net to facilitate fishing at night.

2. Description of the Related Art

Flashlight holders are known in the prior art. For example, U.S. Pat. No. 4,799,132 issued to Perlsweig shows a flashlight holder that mounts a mini-flashlight on a writing instrument; U.S. Pat. No. 4,707,772 issued to Jimenez et al. and U.S. Pat. No. 4,542,447 issued to Quakenbush both disclose flashlight mounting systems for attaching a flashlight to a firearm; U.S. Pat. No. 5,062,026 issued to Maglica et al., U.S. Pat. No. 5,181,774 issued to Lane, and U.S. Pat. No. 5,144,546 issued to Burdi disclose various flashlight holders and brackets for attaching flashlights to bicycle handlebars; U.S. Pat. No. 5,601,356 issued to McWilliams discloses a device for mounting a flashlight to a person's wrist; and U.S. Pat. No. 6,536,911 issued to DiAngelo shows a flashlight holder for securing a flashlight to a wheeled measuring device. While these flashlight holders presumably function as intended in these various applications, none have been disclosed for use with handheld fishing nets.

Handheld fishing nets are often used by fishermen to help land fish caught by a rod and reel or other tackle. When a fish is caught, the fisherman normally reels his or her line in until the fish is pulled close to the fisherman's boat or dock but still beneath the surface of the water. A handheld fishing net, also referred to as a dip net, is then dipped into the water and the fish is scooped out of the water using the net and brought into the boat or onto the dock. This maneuvering with the rod and reel and the dip net requires skill, particularly when performed by one person acting alone. The fishing net ensures that the fish does not break the line and escape as the fish is lifted from the water.

It is common to fish in low light conditions, such as at dusk or at night. Fishermen often position a lantern or other light source near them so they can see their fishing equipment, the surface of the water, and the fish being caught. However, a typical lantern provides diffuse light over a wide area and usually does not direct a high intensity light to the surface of the water where it is needed to maneuver the fishing net and enable a fisherman to see the fish as it is being landed. Attempts at positioning lights on the boat or at the boat dock have failed because the exact location of where the fish is pulled out of the water often changes for each fish, making stationary lights inadequate.

Many fishermen use handheld flashlights while fishing at night to see the fish they are trying to land. However, handheld flashlights are difficult to use when a fisherman is fishing alone and landing a fish because this requires the fisherman to juggle the rod and reel, the handheld net, and the flashlight all at the same time. One solution to this problem is to have a fishing buddy handle the flashlight and/or the fishing net while the rod and reel are handled by the fisherman. However, this is not always convenient and still does not solve the problem when fishing alone.

One attempt at solving this problem was to have a light built into the handle of the fishing net to illuminate the ring on the net. However, this fishing net with a built-in light met with little success in the market because it was not cost effective. Most fishermen already have a fishing net and did not want to purchase another net just to gain the light feature.

Thus, there is a need in the industry for an improved system for fishing at night that can be used with existing fishing nets and allows a fisherman to conveniently land fish at night, even while fishing alone.

SUMMARY OF THE INVENTION

An object of the present invention is to provide an improved system for fishing at night that solves the problems in the prior art described above.

A further object of the present invention is to provide a system for fishing at night that can be used with existing fishing nets when fishing at night.

A further object of the present invention is to provide a flashlight that snaps onto the handle of an existing fishing net to facilitate landing fish in low light conditions.

A further object of the present invention is to provide a fishing net having a flashlight attached to the handle of the net to illuminate the ring of the net and the surface of the water when landing a fish at night.

A further object of the present invention is to provide a system for attaching a tubular flashlight to the tubular handle of a fishing net that is economical to manufacture, simple to install and use, capable of a long operating life, and particularly well suited for positioning a flashlight to allow use of the fishing net at night.

In order to accomplish these and other objects of the invention, a flashlight holder is provided for removably attaching a flashlight to a tubular handle of a handheld fishing net. The flashlight holder has a first resilient clamp assembly that clamps over the tubular handle of the fishing net. The first resilient clamp assembly includes a generally tubular sleeve having an opening along one side that allows the tubular structure to expand and snap over the outer surface of the tubular handle of the fishing net.

In one embodiment, the flashlight holder is attached to the flashlight by a second resilient clamp assembly that snaps over the tubular housing of the flashlight. In another embodiment, the flashlight holder is attached to the flashlight by an adhesive or by making the flashlight holder integral with the housing of the flashlight. A safety strap is provided to ensure the flashlight holder does not become detached inadvertently from the handle of the fishing net.

According to a broad aspect of the present invention, a fishing net and flashlight combination are provided, comprising: a tubular handle; an annular ring attached to an end of the tubular handle, the ring having a netting material attached thereto; and a flashlight attached to the tubular handle and positioned to direct a light beam toward the ring to facilitate landing fish in low light conditions.

According to another broad aspect of the present invention, a flashlight holder is provided for attaching a flashlight to a fishing net, comprising: a base; a means on one side of the base for securing the flashlight holder to a tubular housing of a flashlight; and a first resilient clamp assembly on another side of the base for attaching the flashlight holder to a tubular handle of a fishing net. The resilient clamp assembly comprises a pair of opposing side sections having arcuate inner surfaces that accommodate an outer surface of the tubular handle of the fishing net. The side sections are resiliently urged toward each other to clamp against the outer surface of the tubular handle and secure the flashlight holder to the tubular handle.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A flashlight holder and fishing net according to preferred embodiments of the present invention will now be described with reference to FIGS. 1 to 8 of the accompanying drawings.

Figure 1:
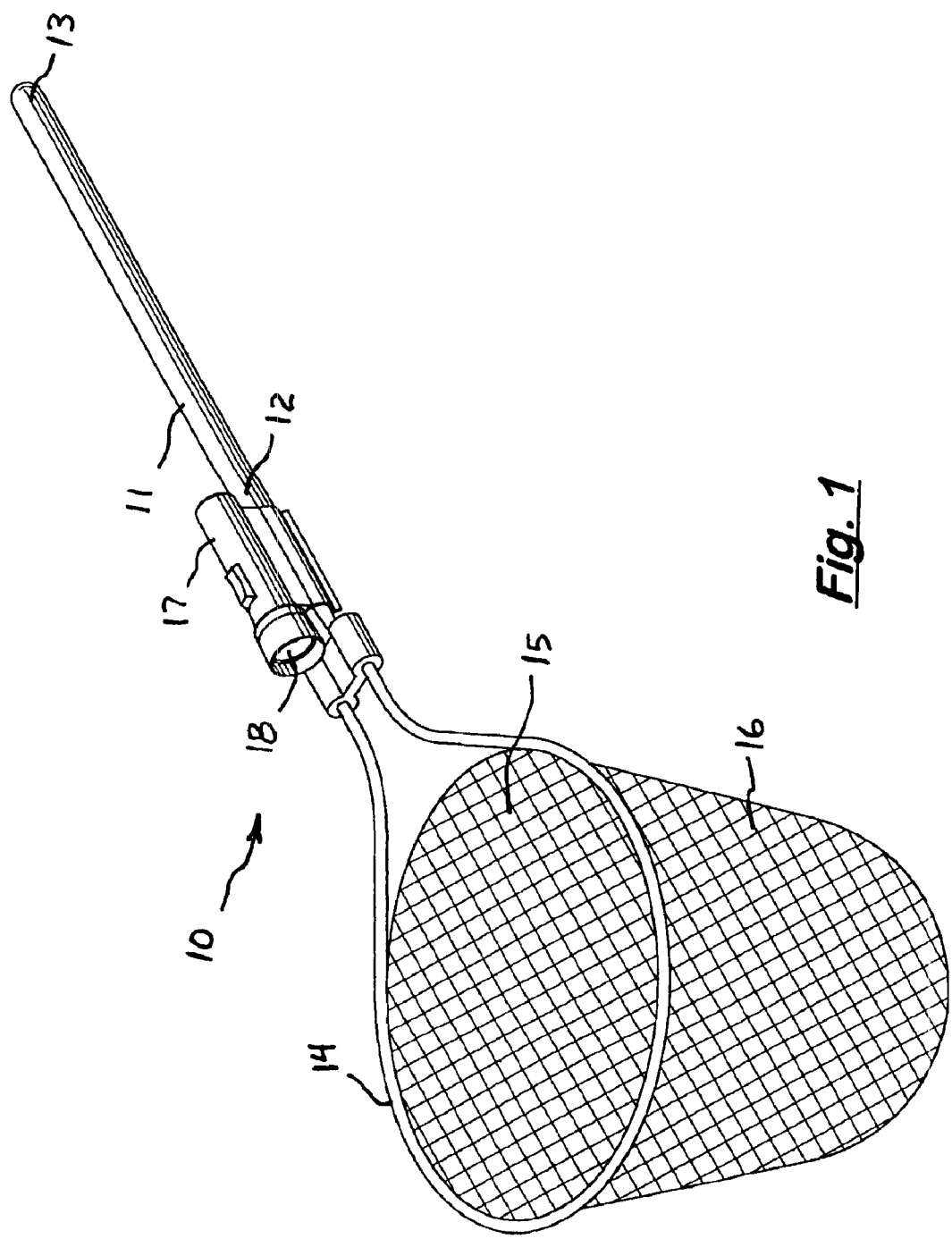
FIG. 1 is a perspective view of a fishing net having a flashlight attached to the handle according to the present invention.

A handheld fishing net 10 is shown in FIG. 1. The fishing net 10 has a tubular handle 11 having a first end 12 and a second end 13. An annular ring 14 is attached to the first end 12 of the handle 11 and defines an opening 15 through which a fish passes during use of the net 10. A netting material 16, such as woven mesh, tied string, or the like, is attached to the annular ring 14. The netting material 16 and annular ring 14 together define a receptacle into which fish can be scooped and lifted from the water during use of the net 10. The fish can then removed from the net 10 by pulling or lifting the fish back through the annular ring 14.

As explained above, a conventional handheld fishing net is often difficult to use at night because the fisherman must juggle his fishing pole, the handheld net, and the flashlight all at the same time. The present invention provides a solution to this problem by mounting a flashlight 17 on the tubular handle 11 of the fishing net 10.

The flashlight 17 is positioned between the first and second ends 12, 13 of the tubular handle of the fishing net 10 with the lamp 18 of the flashlight 17 positioned to direct a light beam toward the ring 14 of the net 10. When arranged in this manner, the flashlight 17 illuminates the annular ring 14, the netting material 16, and the water adjacent to the first end 12 of the handle 11 of the fishing net 10. The flashlight 17 attached to the fishing net 10 allows the fisherman to see the fish being landed in low light conditions, while keeping the fisherman's hands free for handling the net and the fishing pole. The flashlight 17 also enables the fisherman to see and avoid snags and other obstructions in the area that fish are being netted.

Figure 2:
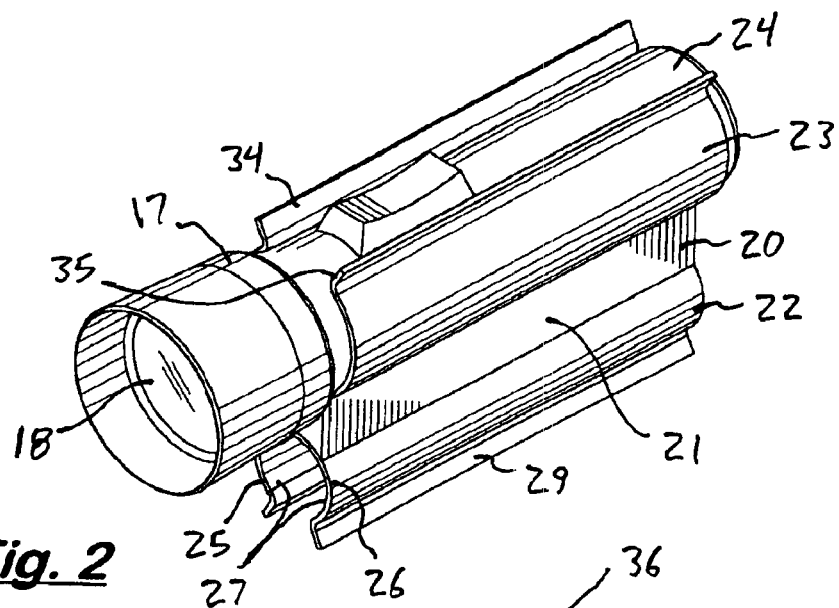
FIG. 2 is a perspective view of a flashlight holder and flashlight for attaching to a fishing net according to a first embodiment of the present invention.
Figure 3:
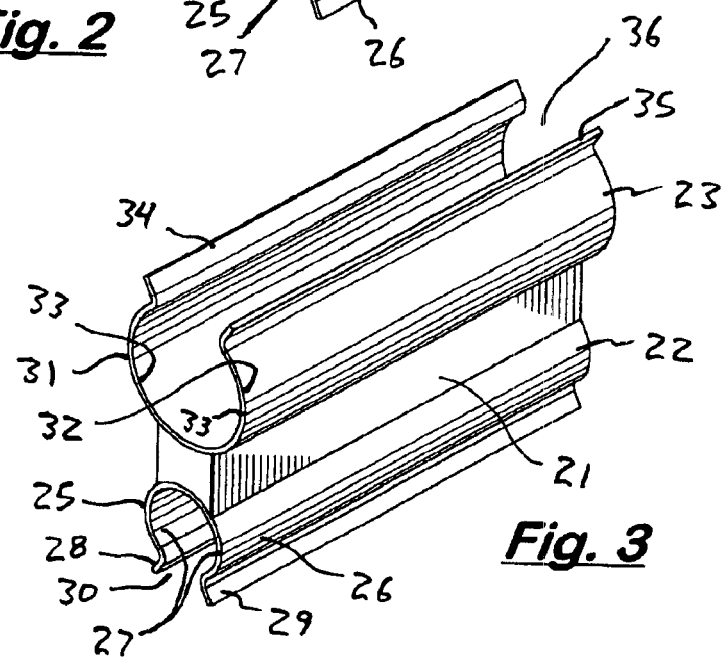
FIG. 3 is a perspective view of the flashlight holder shown in FIG. 2 with the flashlight removed.
Figure 4:
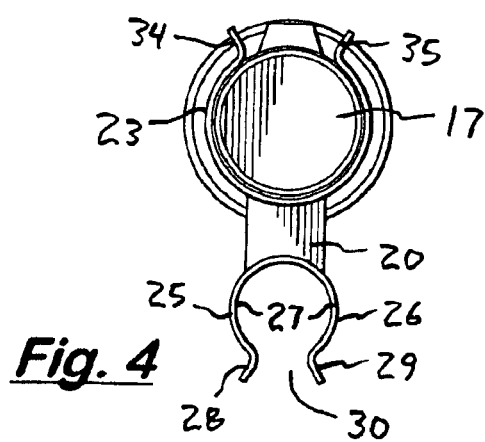
FIG. 4 is a rear end view of the flashlight holder and flashlight shown in FIG. 2.
Figure 5:
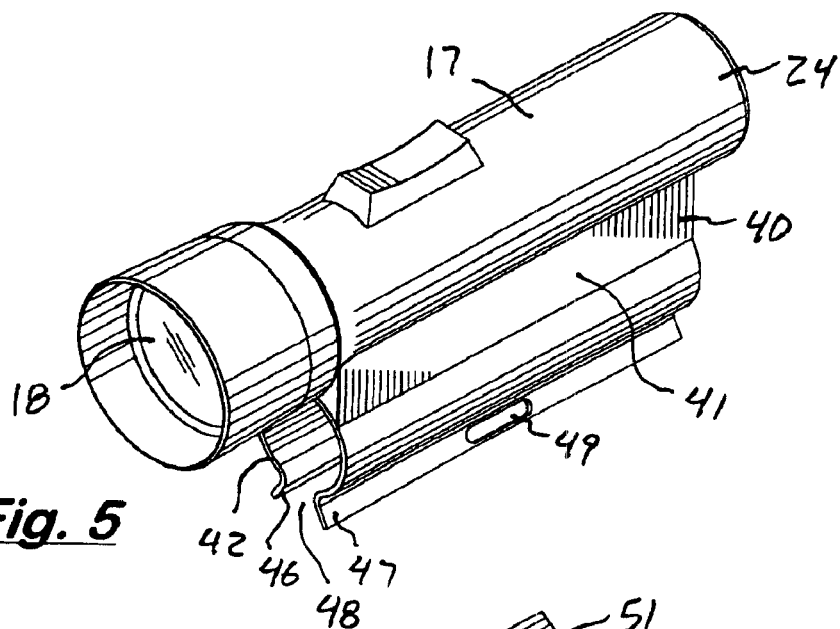
FIG. 5 is a perspective view of a flashlight holder and flashlight for attaching to a fishing net according to a second embodiment of the present invention.
Figure 6:
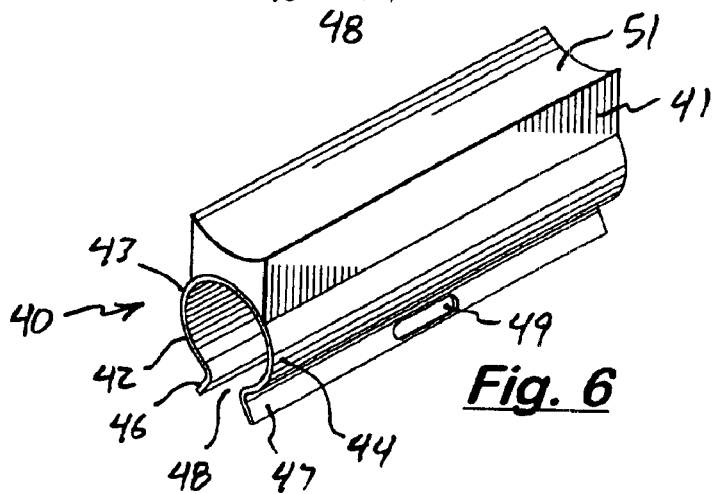
FIG. 6 is a perspective view of the flashlight holder shown in FIG. 5 with the flashlight removed.
Figure 7:
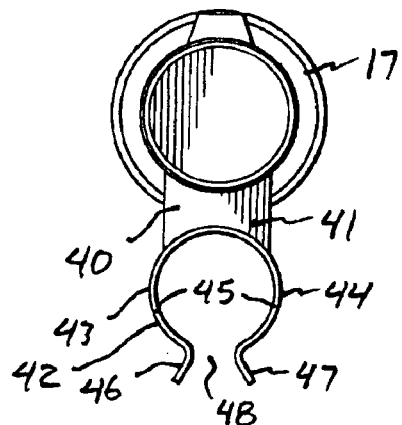
FIG. 7 is a rear end view of the flashlight holder and flashlight shown in FIG. 5.
Figure 8:
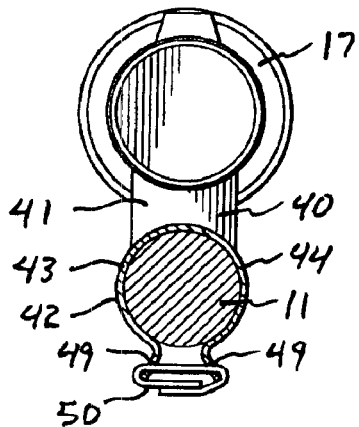
FIG. 8 is a rear end view of the flashlight holder and flashlight attached to a handle of a fishing net.

As shown in FIGS. 2 to 4, a flashlight holder 20 according to a first embodiment of the invention has a base 21, a first resilient clamp assembly 22 on one side of the base 21, and a second resilient clamp assembly 23 on the other side of the base 21. The first resilient clamp assembly 22 clamps over the tubular handle 11 of the fishing net 10. The second resilient clamp assembly 23 clamps over the tubular housing 24 of the flashlight 17. The first and second resilient clamp assemblies 22, 23 each have substantially the same structure, except that the second resilient clamp assembly 23 may have a larger diameter to accommodate flashlight housings, which are normally larger in diameter than fishing net handles. The first and second resilient clamp assemblies 22, 23 are preferably formed of flexible plastic material.

The first resilient clamp assembly 22 comprises a pair of opposing side sections 25, 26 having arcuate inner surfaces 27 that define a generally tubular sleeve. The first resilient clamp assembly 22 can be formed, for example, out of a segment of plastic PVC pipe. The arcuate inner surfaces 27 are shaped to accommodate an outer surface of the tubular handle 11 of the fishing net 10. The side sections 25, 26 are resiliently urged toward each other to clamp against the outer surface of the tubular handle 11 and secure the flashlight holder 20 to the tubular handle 11. The side sections 25, 26 have flared outer ends 28, 29 that define an opening 30 along a length of one side of the first clamp assembly 22 between the opposing side sections 25, 26 to allow the first clamp assembly 22 to expand and snap over the outer surface of the tubular handle 11.

As noted above, the second resilient clamp assembly 23 has substantially the same structure as the first resilient clamp assembly 22. The second resilient clamp assembly 23 comprises a pair of opposing side sections 31, 32 having arcuate inner surfaces 33 that define a generally tubular sleeve. The second clamp assembly 23 can be formed, for example, out of a segment of plastic PVC pipe. The arcuate inner surfaces 33 are shaped to accommodate an outer surface of the tubular housing 24 of the flashlight 17. The side sections 31, 32 are resiliently urged toward each other to clamp against the outer surface of the tubular housing 24 of the flashlight 17 and secure the flashlight 17 to the flashlight holder 20. The side sections 31, 32 have flared outer ends 34, 35 that define an opening 36 along a length of one side of the second clamp assembly 23 between the opposing side sections 31, 32 to allow the second clamp assembly 23 to expand and snap over the outer surface of the flashlight housing 24.

As shown in FIGS. 5 to 8, a flashlight holder 40 according to a second embodiment of the invention has a base 41 and a resilient clamp assembly 42 on one side of the base 41. The resilient clamp assembly 42 clamps over the tubular handle 11 of the fishing net 10 and has generally the same structure as the first resilient clamp assembly 22 in the first embodiment described above.

The resilient clamp assembly 42 comprises a pair of opposing side sections 43, 44 having arcuate inner surfaces 45 that define a generally tubular sleeve. The arcuate inner surfaces 45 are shaped to accomodate an outer surface of the tubular handle 11 of the fishing net 10. The side sections 43, 44 are resiliently urged toward each other to clamp against the outer surface of the tubular handle 11 and secure the flashlight holder 40 to the tubular handle 11 of the net 10.

The side sections 43, 44 have flared outer ends 46, 47 that define an opening 48 along a length of one side of the resilient clamp assembly 42 between the opposing side sections 43, 44 to allow the clamp assembly 42 to expand and snap over the outer surface of the tubular handle 11. A notch 49 is formed in each of the flared outer ends 46, 47. A safety strap 50 (shown in FIG. 8) extends through the notches 49 and secures the flared outer ends 46, 47 together. The safety strap 50 has a hook and pile fastener or the like to fasten its ends together and ensure that the flashlight holder 40 does not become detached inadvertently from the tubular handle 11 of the net 10.

The base 41 of the flashlight holder 40 has an arcuate surface 51 on a side opposite from the resilient clamp assembly 42. The arcuate surface 51 is shaped to correspond to an outer surface of the tubular housing 24 of the flashlight 17. The base 41 of the flashlight holder 40 is secured to the housing 24 of the flashlight 17 using an adhesive, rivets, screws, welding, or other suitable type of fastener. Alternatively, the base 41 of the flashlight holder 40 can be molded out of plastic integral with the housing 24 of the flashlight 17.

While the invention has been specifically described in connection with specific embodiments thereof, it is to be understood that this is by way of illustration and not of limitation, and the scope of the appended claims should be construed as broadly as the prior art will permit.

What is claimed is:

1. A fishing net and flashlight combination, comprising:
    a tubular handle;
    an annular ring attached to an end of the tubular handle, the ring having a netting material attached thereto;
    a flashlight holder comprising a first resilient clamp assembly that clamps over the tubular handle of the fishing net, said first resilient clamp assembly comprising a pair of opposing side sections having arcuate inner surfaces that accommodate an outer surface of the tubular handle of the fishing net, the side sections being resiliently urged toward each other to clamp against the outer surface of the tubular handle and secure the flashlight holder to the tubular handle; and
    a flashlight secured to the flashlight holder and attached to the tubular handle via the flashlight holder and positioned to direct a light bean toward the ring to facilitate landing fish in low light conditions.

2. The fishing net and flashlight combination according to claim 1, wherein the side sections have flared outer ends that define an opening along a length of the first clamp assembly between the opposing side sections to allow the first clamp assembly be snapped onto the tubular handle.

3. The fishing net and flashlight combination according to claim 1, wherein the structure for securing the flashlight holder to the flashlight comprises a second resilient clamp assembly that clamps over a housing of the flashlight.

4. The fishing net and flashlight combination according to claim 3, wherein the second resilient clamp assembly has substantially the same structure as the first resilient clamp assembly.

5. The fishing net and flashlight combination according to claim 1, wherein said first resilient clamp assembly is formed of flexible plastic.

6. The fishing net and flashlight combination according to claim 1, wherein the flashlight has a housing and a flashlight holder is permanently attached to or integral with the housing.

7. The fishing net and flashlight combination according to claim 1, wherein a notch is formed in each of the opposing side sections, and a safety strap extends through the notches and around the tubular handle to ensure the flashlight holder does not become detached inadvertently from the tubular handle.

8. A flashlight holder for attaching the flashlight to a fishing net, comprising:
    the flashlight having a housing and a lamp at end thereof;
    the flashlight holder having a base which is permanently attached to or integral with the housing of the flashlight; and
    the flashlight holder further comprising a first resilient clamp assembly on one side of the base for attaching the flashlight holder to a single tubular of a fishing net, said resilient clamp assembly comprising a pair of opposing side sections having arcuate inner surfaces that accommodate an outer of the tubular handle of the fishing net, the side sections being resiliently urged toward each other to clamp against the outer surface of the tubular handle and secure the flashlight holder to the tubular handle.

9. The flashlight holder according to claim 8, wherein the side sections have flared outer ends that define an opening along a length of the resilient clamp assembly between the opposing side sections to allow the resilient clamp assembly to be snapped onto a tubular handle of a fishing net.

10. The flashlight holder according to claim 8, wherein the first resilient clamp assembly is formed of flexible plastic.

11. The flashlight holder for attaching a flashlight to a fishing net, comprising:
    a base;
    a means on one side of the base for securing the flashlight holder to a tubular housing of a flashlight; and
    a first resilient clamp assembly on another side of the base for attaching the flashlight holder to a tubular handle of a fishing net, said resilient clamp assembly comprising a pair of opposing side sections having arcuate inner surfaces that accommodate an outer surface of the tubular handle of the fishing net, the side sections being resiliently urged toward each other to clamp against the outer surface of the tubular handle and secure the flashlight holder to the tubular handle;
    further comprising a notch formed in each of the opposing side sections, and a safety strap extending through the notches and around the tubular handle to ensure the flashlight holder does not become detached inadvertently from the tubular handle.

12. The flashlight holder according to claim 8, wherein said flashlight holder is secured to the flashlight by an adhesive that secures the base of the flashlight holder to the housing of the flashlight.

13. The flashlight holder according to claim 8, wherein said flashlight holder is secured to the flashlight by the base of the flashlight holder being formed integral with the housing of the flashlight.

14. A fishing net for use at night, comprising:
    a single tubular handle having a first end and a second end;
    an annular ring attached to the first end of the tubular handle, the ring having a netting material attached thereto; and
    a flashlight removably attached to the tubular handle between the first and second ends of the handle, the flashlight being positioned to direct a light beam toward the first end of the handle to facilitate use of the fishing net in low light conditions, wherein the flashlight is attached to the fishing net by a firts resielient clamp assembly formed of flexible plastic that clamps over the tubular handle of the fishing net, the first resilient clamp assembly comprising a generally tubular sleeve having an opening along one side that allows the tubular structure to expand and snap over the outer surface of the tubular handle of the fishing net.

15. The fishing net according to claim 14, wherein a pair of notches are formed in the tubular sleeve, and a safety strap extends through the notches and around the tubular handle to ensure the flashlight holder does not become detached inadvertently from the tubular handle of the fishing net.

* * * * *